(12) United States Patent
Kim et al.

(10) Patent No.: US 7,221,518 B2
(45) Date of Patent: May 22, 2007

(54) ZOOM LENS OPTICAL SYSTEM

(75) Inventors: Jin-woo Kim, Changwon-si (KR); Dong-woo Kim, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 76 days.

(21) Appl. No.: 11/328,903

(22) Filed: Jan. 9, 2006

(65) Prior Publication Data

US 2007/0053071 A1    Mar. 8, 2007

(30) Foreign Application Priority Data

Sep. 2, 2005    (KR) .................. 10-2005-0081757

(51) Int. Cl.
*G02B 15/14* (2006.01)
(52) U.S. Cl. ..................................... 359/687
(58) Field of Classification Search ............. 359/676, 359/683, 687
See application file for complete search history.

(56) References Cited

U.S. PATENT DOCUMENTS

| | | | | |
|---|---|---|---|---|
| 5,986,821 | A | * | 11/1999 | Yoon ..................... 359/692 |
| 6,185,050 | B1 | * | 2/2001 | Ota et al. ................ 359/691 |
| 2003/0002171 | A1 | | 1/2003 | Sato |

FOREIGN PATENT DOCUMENTS

| JP | 2001-356269 A | 12/2001 |
|---|---|---|
| JP | 2002-107629 A | 4/2002 |
| JP | 2003-177317 A | 6/2003 |
| JP | 2004-109653 A | 4/2004 |

* cited by examiner

*Primary Examiner*—Scott J. Sugarman
(74) *Attorney, Agent, or Firm*—Gardner Carton & Douglas LLP

(57) ABSTRACT

A compact zoom lens optical system that includes: a first lens group having positive refractive power; a second lens group having negative refractive power; a third lens group having positive refractive power; and a fourth lens group having positive refractive power, wherein the first through fourth lens groups are arranged sequentially from an object, zooming is performed from a wide angle position to a telephoto position so that the distance between the first lens group and the second lens group increases, the distance between the second lens group and the third lens group decreases, and the distance between the third lens group and the fourth lens group increases, and the first through fourth lens groups satisfy:

$$6 \le \frac{L_W}{F_W} + \frac{L_t}{F_t} \le 8$$

where $L_w$ denotes a distance between a first surface of an object-side lens of the first lens group and an image surface when in the wide angle position, $L_t$ denotes a distance between the first surface of the object-side lens of the first lens group and the image surface when in the telephoto position, $F_w$ denotes an overall focal length when in the wide angle position, and the $F_t$ denotes an overall focal length when in the telephoto position.

28 Claims, 9 Drawing Sheets

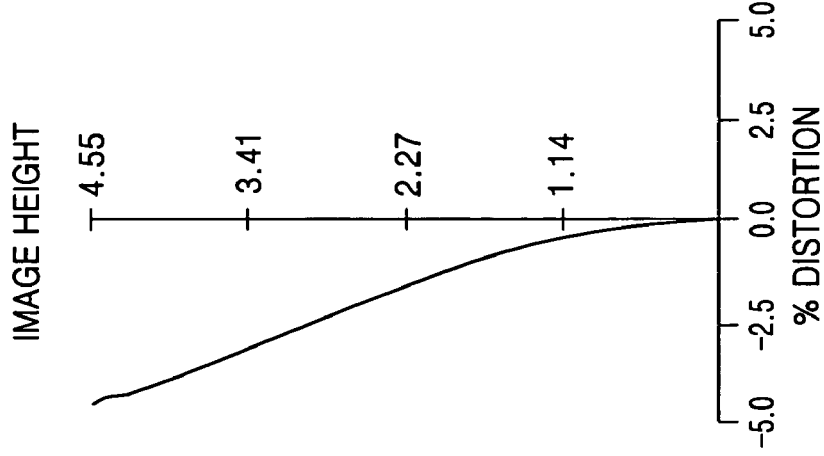
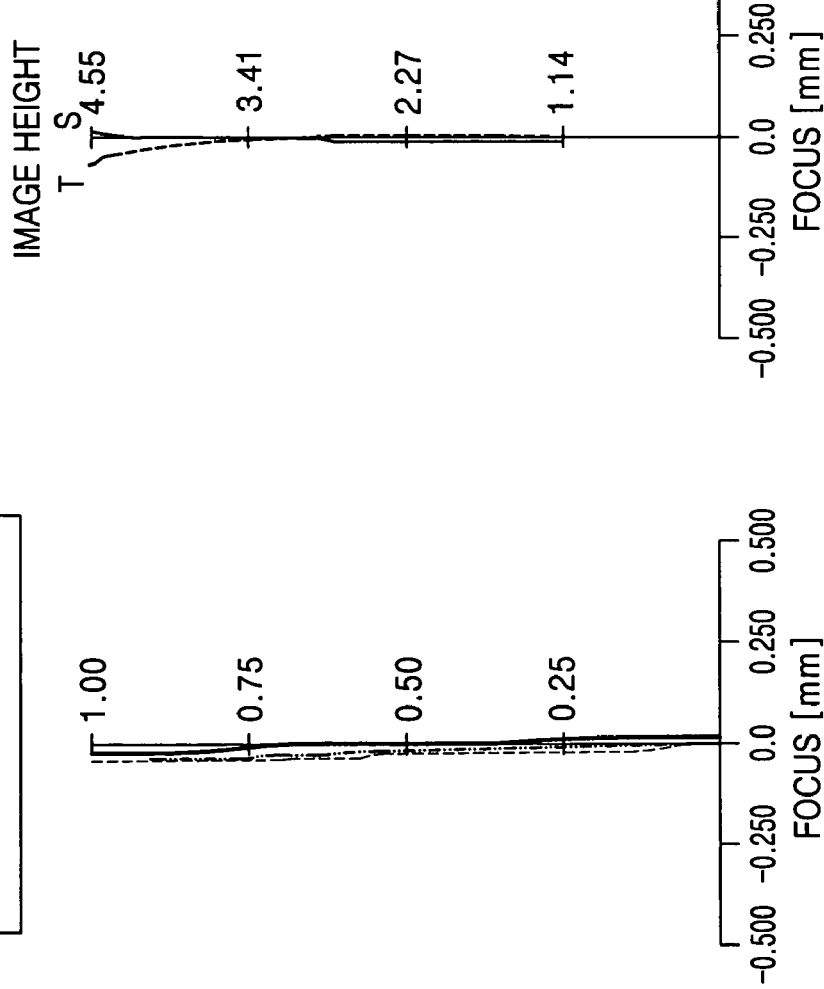
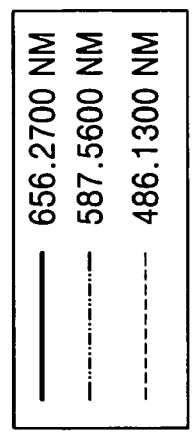

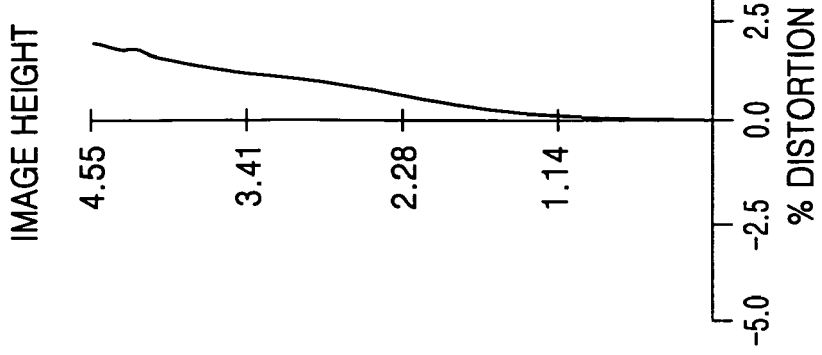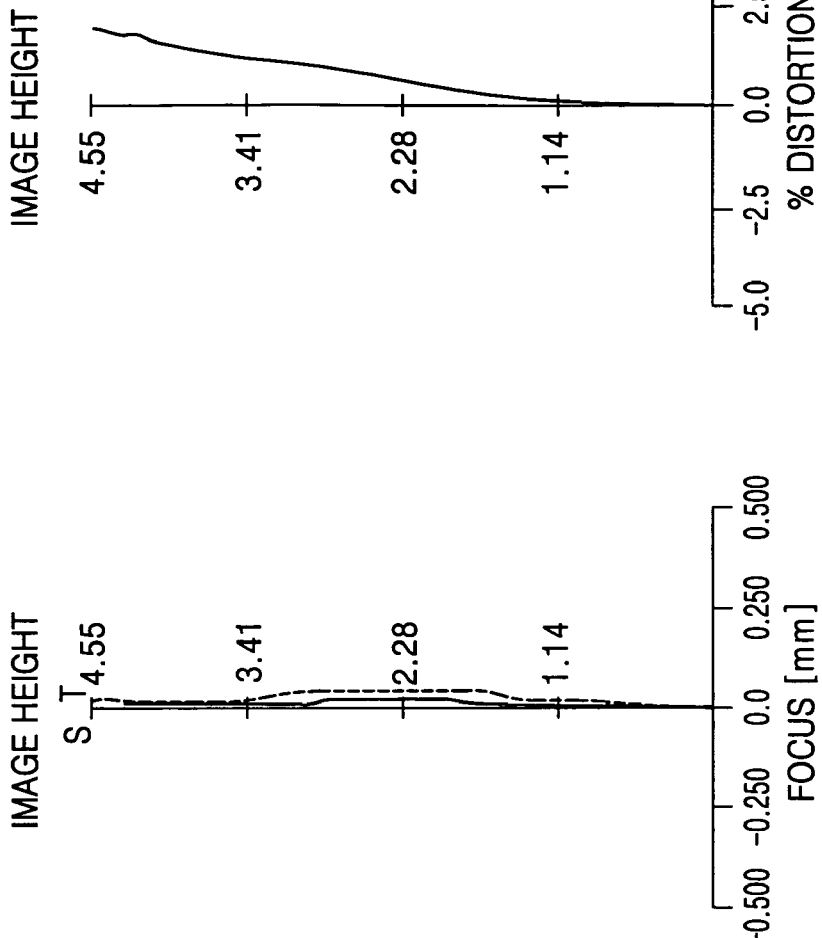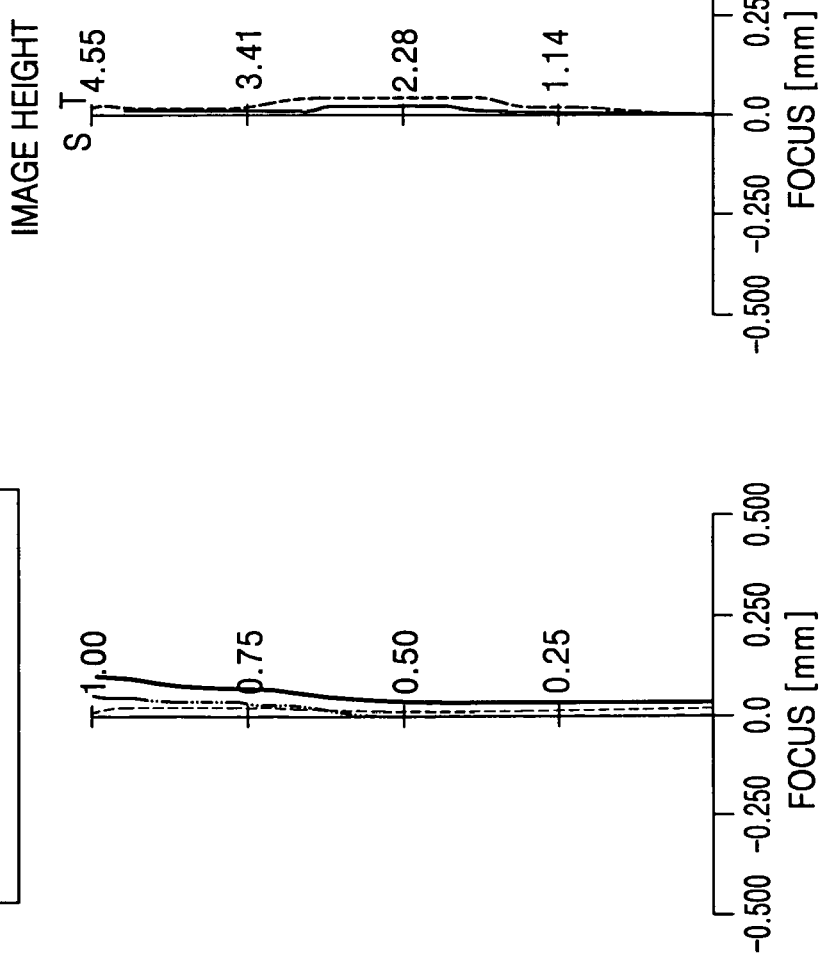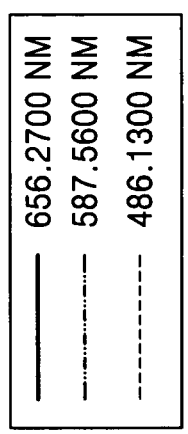

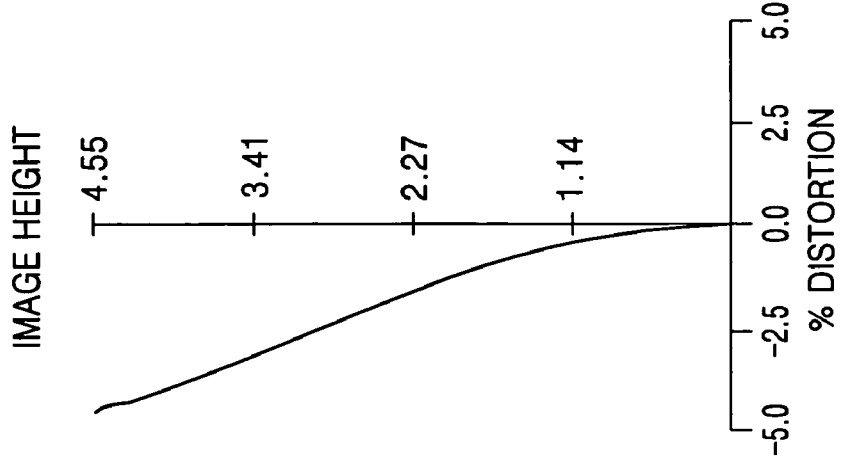
FIG. 5C
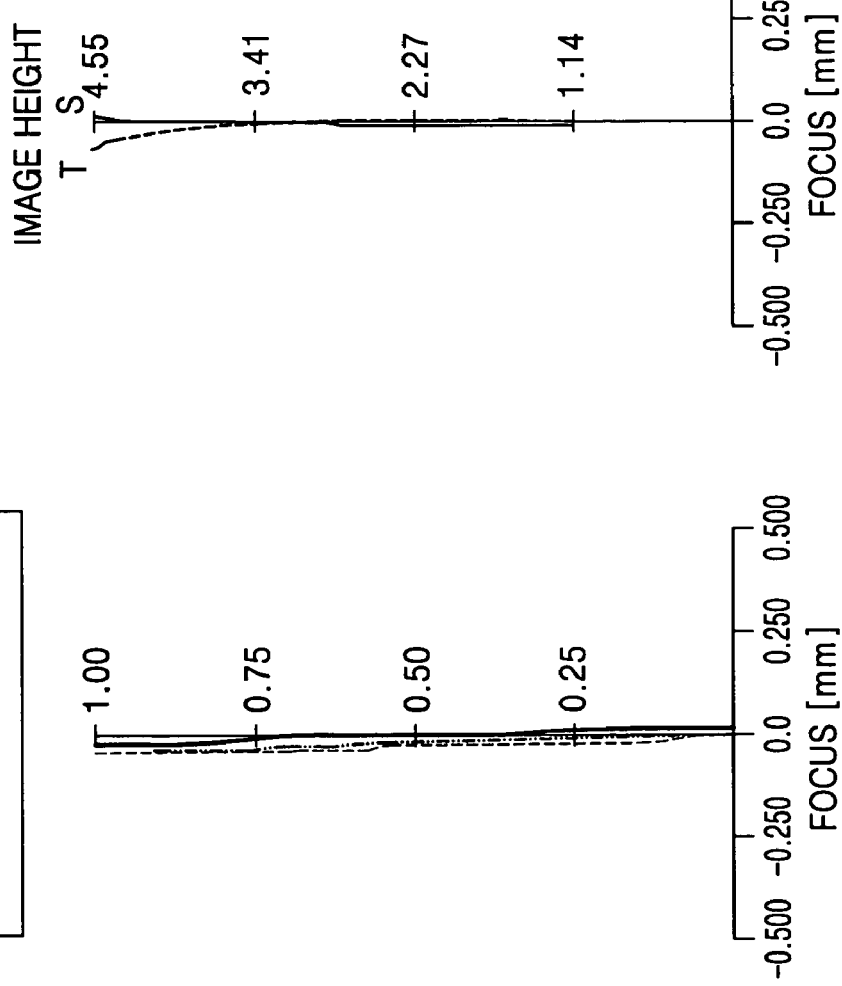
FIG. 5B
FIG. 5A
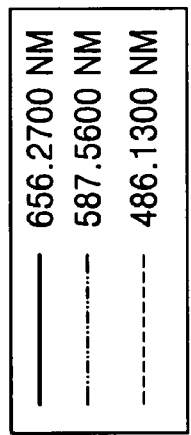

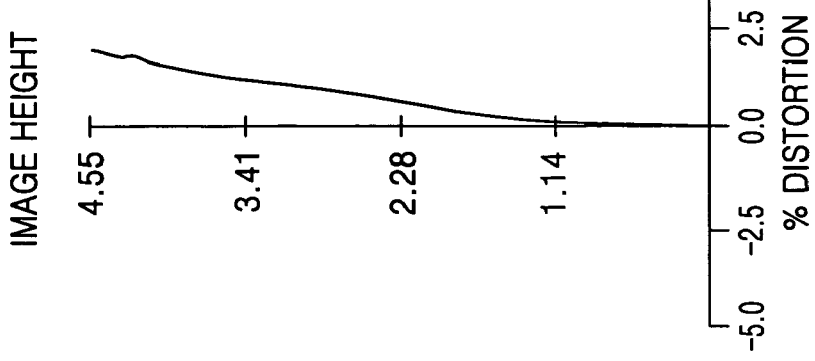
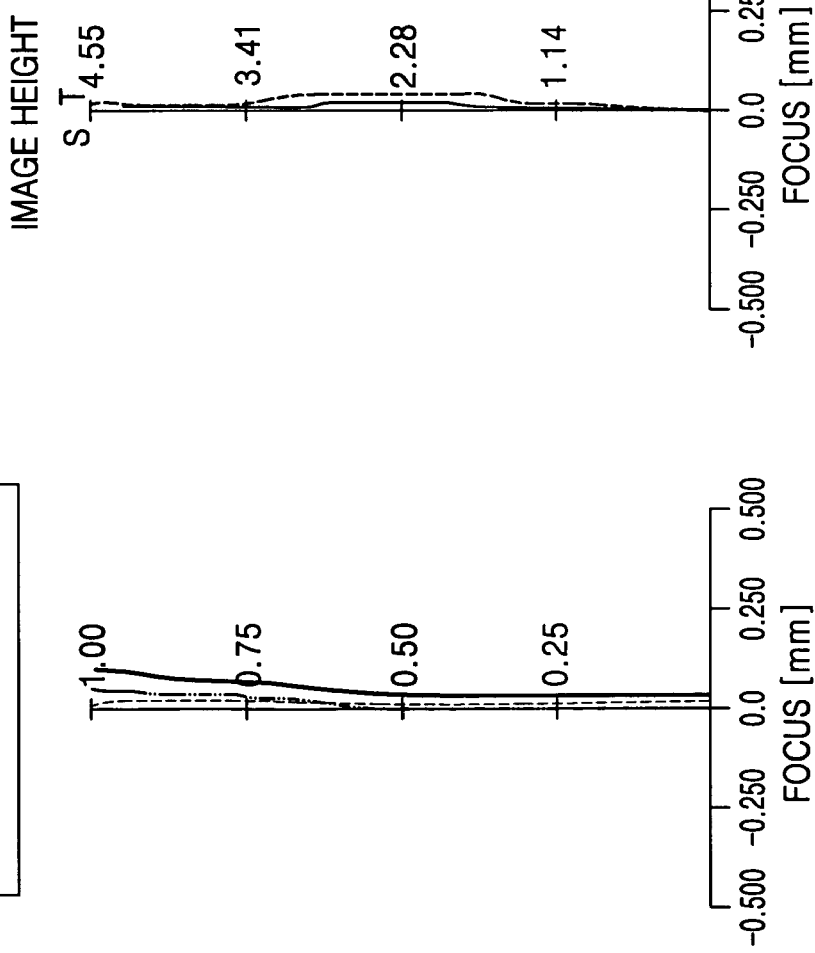

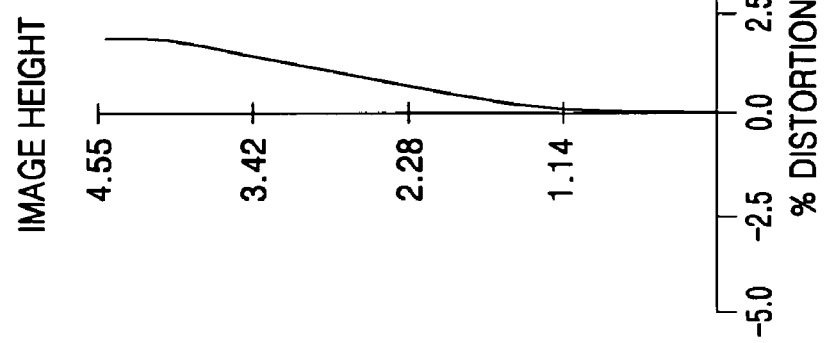
FIG. 9A
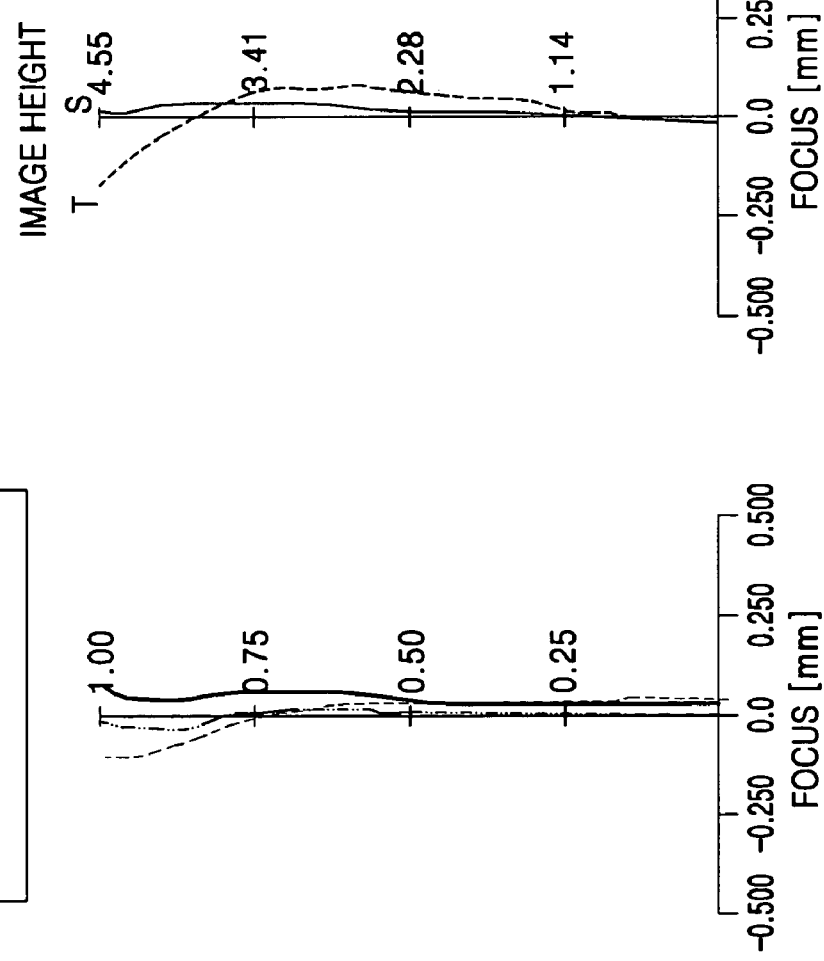
FIG. 9B
FIG. 9C

ZOOM LENS OPTICAL SYSTEM

CROSS-REFERENCE TO RELATED PATENT APPLICATION

This application claims the benefit of Korean Patent Application No. 10-2005-0081757, filed on Sep. 2, 2005, in the Korean Intellectual Property Office, the disclosure of which is incorporated herein in its entirety by reference.

BACKGROUND OF THE INVENTION

1. Field of the Invention

The present invention relates to a zoom lens optical system suitable for a camera using a solid state imaging device, and more particularly, to a zoom lens optical system which can be made compact, correct color aberration, ensure a high zooming ratio, and have low manufacturing costs.

2. Description of the Related Art

Electronic still cameras and video cameras using a solid state imaging device, such as a charge coupled device (CCD) or a complementary metal oxide semiconductor (CMOS), are rapidly becoming more prevalent. Such cameras are being developed cheaper, lighter, and more compact. Accordingly, a zoom lens optical system used in these cameras is also required to be less expensive, lighter, and more compact.

Japanese Patent Publication No. 2004-109653 (Apr. 8, 2004) discloses a 4-group zoom lens optical system. The zoom lens optical system includes a first lens group having positive refractive power, a second lens group having negative refractive power, a third lens group having positive refractive power, and a fourth lens group having positive refractive power, arranged sequentially from an object. The zoom lens optical system performs zooming by moving the first through fourth lens groups. The first lens group and the third lens group when at a telephoto position of their ranges are closer to the object than when at a wide angle position of their ranges. Since the first lens group has a single lens, color aberration compensation by the first lens group is difficult. Since the zoom lens optical system is long, product value decreases.

Japanese Patent Publication No. 2001-356269 (Dec. 26, 2001) discloses a 4-group zoom lens optical system. The zoom lens optical system includes a first lens group having a single positive lens, a second lens group having at least one negative lens and one positive lens, a third lens group having one negative lens and two positive lenses, and a fourth lens group having at least one positive lens, arranged sequentially from an object. The zoom lens optical system performs zooming by moving the first through third lens groups. The zoom lens optical system has the drawback in that color aberration compensation is difficult since the first lens group has the single lens. Also, since the fourth lens group has two or more lenses, the number of lenses increase, thereby increasing production costs and requiring a large receiving space.

U.S. Patent Publication No. 2003/0002171 A1 (Jan. 2, 2003) discloses a 4-group zoom lens optical system. The zoom lens optical system includes first through fourth lens groups sequentially arranged from an object. The zoom lens optical system performs zooming by operating the first through fourth lens groups and causing a change in space between the first lens group and the second lens group. The zoom lens optical system has an advantage in that color aberration can be easily corrected since the first lens group has three lenses. However, the third lens group has four or more lenses, and thus production costs increase. Also, aspherical materials of the third lens group and the fourth lens group are incompatible, and thus the system is expensive and difficult to manufacture.

Japanese Patent Publication No. 2003-177317 (Jun. 27, 2003) discloses a 4-group zoom lens optical system which performs zooming by operating first, third, and fourth lens groups. The first lens group has three lenses, the second lens group has four lenses, the third lens group has two positive lenses and a negative lens, and the fourth lens group has three lenses. Since each of the first lens group and the fourth lens group has three lenses, aberration is reduced, but it is difficult to make the zoom lens optical system inexpensive and compact due to the increase in the number of lenses.

Japanese Patent Publication No. 2002-107629 (Apr. 10, 2002) discloses a 4-group zoom lens optical system which operates all of first through fourth lens groups. The first lens group has three lenses, the second lens group has four lenses, the third lens group has two positive lenses and a negative lens, and the fourth lens group has five lenses. In this case, color aberration and astigmatic field curvature can be corrected since the first lens group has three lenses. However, since the number of lenses increases, automatic focusing is difficult and the size and costs of the zoom lens optical system increase.

SUMMARY OF THE INVENTION

The present invention provides a zoom lens optical system which can be suitable for a camera using a solid state imaging device, can be made compact, can correct color aberration, ensure a high zooming ratio, and have low manufacturing costs.

According to an aspect of the present invention, there is provided a zoom lens optical system comprising: a first lens group having positive refractive power; a second lens group having negative refractive power; a third lens group having positive refractive power; and a fourth lens group having positive refractive power, wherein the first through fourth lens groups are arranged sequentially from an object, zooming is performed from a wide angle position to a telephoto position by moving the first through third lens groups so that the distance between the first lens group and the second lens group increases, the distance between the second lens group and the third lens group decreases, and the distance between the third lens group and the fourth lens group increases, and the first through fourth lens groups satisfy:

$$6 \leq \frac{L_W}{F_W} + \frac{L_t}{F_t} \leq 8$$

where $L_w$ denotes a distance between a first surface of an object-side lens of the first lens group and an image surface when in the wide angle position, $L_t$ denotes a distance between the first surface of the object-side lens of the first lens group and the image surface when in the telephoto position, $F_w$ denotes an overall focal length when in the wide angle position, and the $F_t$ denotes an overall focal length when in the telephoto position.

Each of the third and fourth lens groups may have an aspherical surface and satisfies:

$$58.8 \leq V_{d3} \leq 60.8$$

$$58.8 \leq V_{d4} \leq 60.8$$

where $V_{d3}$ denotes the Abbe number of an aspherical lens of the third lens group and $V_{d4}$ denotes the Abbe number of an aspherical lens of the fourth lens group.

BRIEF DESCRIPTION OF THE DRAWINGS

The above and other features and advantages of the present invention will become more apparent by describing in detail exemplary embodiments thereof with reference to the attached drawings in which:

FIGS. 2A through 2C illustrate spherical aberration, astigmatic field curvature, and distortion, respectively, of the zoom lens optical system of FIG. 1A when in the wide angle position;

FIGS. 3A through 3C illustrate spherical aberration, astigmatic field curvature, and distortion, respectively, of the zoom lens optical system of FIG. 1C when in the telephoto position;

FIGS. 5A through 5C illustrate spherical aberration, astigmatic field curvature, and distortion, respectively, of the zoom lens optical system of FIG. 4A when in the telephoto position;

FIGS. 6A through 6C illustrate spherical aberration, astigmatic field curvature, and distortion, respectively, of the zoom lens optical system of FIG. 4C when in the telephoto position;

FIGS. 9A through 9C illustrate spherical aberration, astigmatic field curvature, and distortion, respectively, of the zoom lens optical system of FIG. 7C when in the telephoto position.

DETAILED DESCRIPTION OF THE INVENTION

The present invention will now be described more fully with reference to the accompanying drawings, in which embodiments of the invention are illustrated.

Figure 1A:
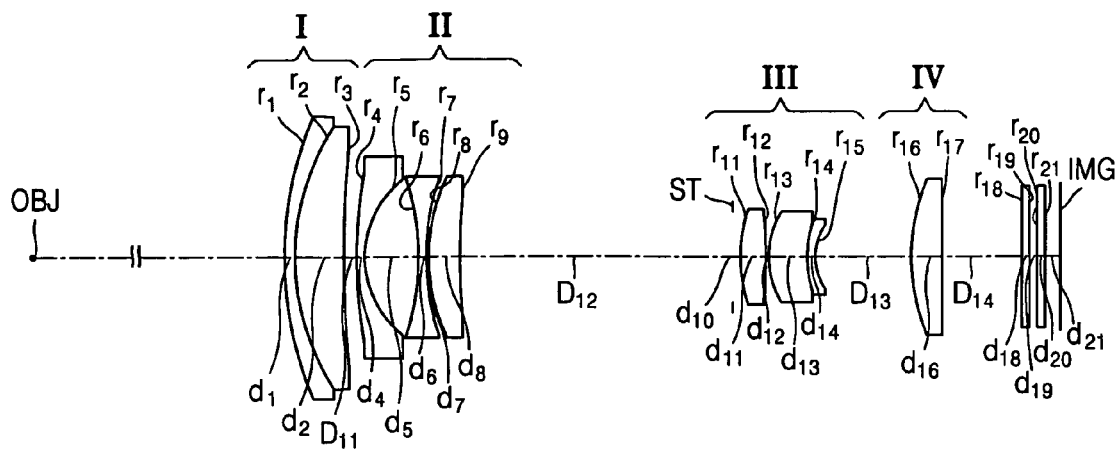
FIG. 1A is a cross-sectional view illustrating an optical configuration of a zoom lens optical system according to an embodiment of the present invention in a wide angle position.
Figure 1B:
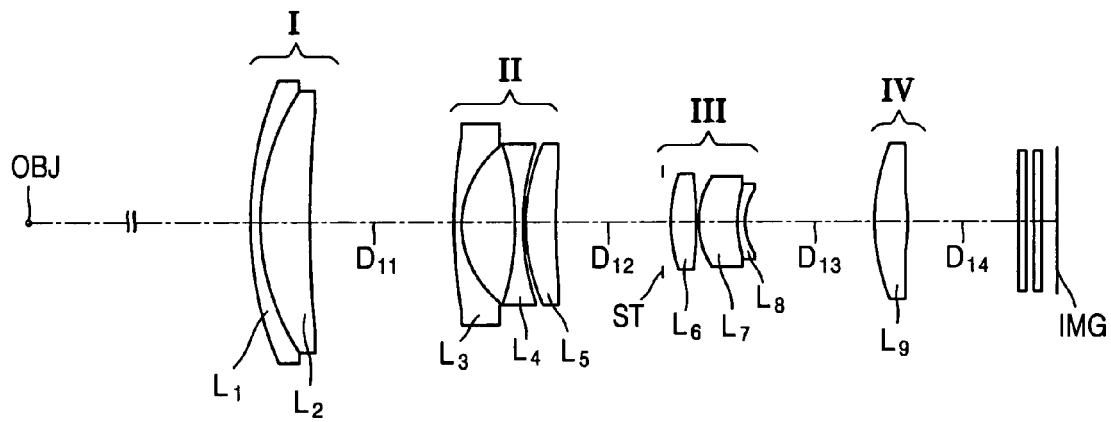
FIG. 1B is a cross-sectional view illustrating an optical configuration of the zoom lens optical system of FIG. 1A in a medium angle position.
Figure 1C:
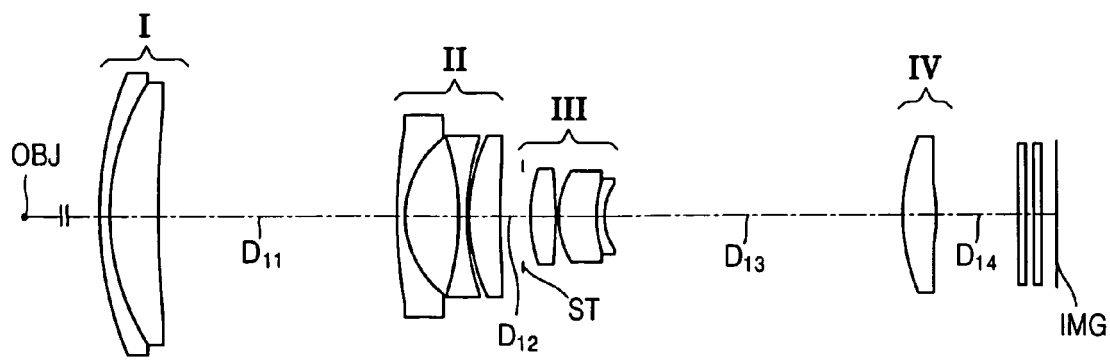
FIG. 1C is a cross-sectional view illustrating an optical configuration of the zoom lens optical system of FIG. 1A in a telephoto position.

FIGS. 1A, 1B, and 1C illustrate optical arrangements of a zoom lens optical system according to an embodiment of the present invention, respectively, in a wide angle position, a medium angle position, and a telephoto position.

Referring to FIGS. 1A, 1B, and 1C, the zoom lens optical system includes a first lens group I having positive refractive power, a second lens group II having negative refractive power, a third lens group III having positive refractive power, and a fourth lens group IV having positive refractive power, arranged sequentially from an object OBJ. A stop ST moving together with the third lens group III is interposed between the second lens group II and the third lens group III.

Zooming is performed by moving the first through third lens groups I, II, and III along an optical axis, and the movement of a focus position occurring during the zooming is corrected by moving the fourth lens group IV.

The operation of each of the lens groups I, II, III, and IV when zooming from the wide angle position (see FIG. 1A) through the medium angle position (see FIG. 1B) to the telephoto position (FIG. 1C) will now be explained.

Zooming is performed from the wide angle position (see FIG. 1A) to the telephoto position (see FIG. 1C) by moving the first through third lens groups I, II, and III so that the distance between the first lens group I and the second lens group II increases, the distance between the second lens group II and the third lens group III decreases, and the distance between the third lens group III and the fourth lens group IV increases. Focusing, that is, a process of correcting the location of the focus position for the object OBJ to be projected clearly on of an image surface during zooming is performed by moving the fourth lens group IV. Since only the fourth lens group IV is used to perform focusing, the zoom lens optical system can be miniaturized.

Since the fourth lens group IV has positive refractive power, the fourth lens group IV has telecentricity required by cameras that use image forming media, such as solid state imaging devices. Telecentricity denotes the ability of a principal ray of light incident on a lens system to be perpendicular to the image plane.

Lens structures of the first through fourth lens groups I, II, III, and IV will now be explained in detail.

The first lens group I has two lenses including a negative lens $L_1$ and a positive lens $L_2$, arranged sequentially from the object OBJ. The two lenses $L_1$ and $L_2$ are combined with each other to form a doublet. The positive lens $L_2$ may be made of a less dispersive material than that of the negative lens $L_1$ as described later, so as to correct lateral color aberration.

The second lens group II has a meniscus negative lens $L_3$ with a convex object-side surface, a double concave negative lens $L_4$, and a meniscus positive lens $L_5$ with a convex object-side surface, arranged sequentially from the first lens group I. The double concave negative lens $L_4$ has relatively a low dispersion value, which is the reciprocal of the Abbe number Vd, and the meniscus positive lens $L_5$ has a relatively high dispersion value, so as to correct color aberration. Since the second lens group II reduces the focal length change during zooming, the change in the overall length of the zoom lens optical system during zooming at high magnification can also be reduced.

The third lens group III has a plurality of lenses, and at least two of the plurality of lenses may be combined with each other. The third lens group III may have at least one aspherical lens.

For example, the third lens group III can have three lenses including a positive aspherical lens $L_6$ with an aspherical surface, a positive lens $L_7$, and a negative lens $L_8$. A light exit surface of the positive lens $L_7$ and a light entrance surface of the negative lens $L_8$ may be combined with each other to form a doublet.

Accordingly, the positive aspherical lens $L_6$ can minimize spherical aberration. Since the lenses having a high dispersion value and a low dispersion value are combined, color aberration caused during zooming at high magnification can be reduced.

The fourth lens group IV may have a single lens. At least one surface of the lens may be aspherical. The fourth lens group IV corrects distortion aberration and astigmatic field curvature.

The fourth lens group IV may have a single positive aspherical lens. When movement of the image surface caused by movement of the object OBJ is corrected using the fourth lens group IV, the movement of the fourth lens group IV can be minimized by minimizing the focal length of the fourth lens group IV and moving the fourth lens group IV on a convex trajectory toward the object OBJ. Accordingly, the zoom lens optical system can be easily made compact.

The zoom lens optical system according to the present embodiment may satisfy the following Formulae 1 through 3.

$$6 \leq \frac{L_W}{F_W} + \frac{L_t}{F_t} \leq 8 \quad (1)$$

where $L_w$ denotes a distance between a first surface of the object-side lens of the first lens group I and the image surface when in the wide angle position, $L_t$ denotes a distance between the first surface of the object-side surface of the first lens group I and the image surface when in the telephoto position, $F_w$ denotes an overall focal length when in the wide angle position, and $F_t$ denotes an overall focal length when in the telephoto position.

Formula 1 defines the ratio of a focal length to an overall length of the zoom lens optical system when in the wide angle position and when in the telephoto position. If the sum of the ratios exceeds the upper limit of Formula 1, the overall length of the zoom lens optical system is large, making it difficult to make the zoom lens optical system compact. If the sum of the ratios is below the lower limit, the refractive powers of the second lens group II and the third lens group III increase, thereby making it difficult to correct spherical aberration and lateral color aberration.

$$58.8 \leq V_{d3} \leq 60.8$$

$$58.8 \leq V_{d4} \leq 60.8 \quad (2)$$

In Formula 2, $V_{d3}$ denotes the Abbe number of the aspherical lens of the third lens group III, and $V_{d4}$ denotes Abbe number of the aspherical lens of the fourth lens group IV. Since the aspherical lenses are made of a material having a medium Abbe number, the burden of correcting color aberration when designing the structure of aspherical lenses can be reduced. Since a plurality of suitable materials exist, the aspherical lenses can be stably supplied and lens manufacturing costs can be reduced. Examples of the suitable materials include CSK120 produced by Matsushita, BaCD12 produced by Hoya, L-BAL42 produced by Ohara, and the like.

$$1.75 \leq \frac{F_t}{F_{IV}} \leq 2 \quad (3)$$

where $F_t$ denotes the overall focal length when in the telephoto position, and $F_{IV}$ denotes the focal length of the fourth lens group IV.

Formula 3 defines the ratio of the focal length of the fourth lens group IV to the overall focal length when in the telephoto position. If the ratio exceeds the upper limit, a material having a high refractive index is required, making it difficult to produce the zoom lens optical system inexpensively. If the ratio is below the lower limit, the movement of the fourth lens group IV required to compensate for the movement of the image surface increases, making it difficult to make the zoom lens optical system compact.

The radius of curvature, thickness or distance between lenses, refractive index, and the Abbe number of each of the lenses constituting the zoom lens optical system illustrated in FIGS. 1A through 1C are shown in Tables 1 through 3.

TABLE 1

F; 8.04~17.7~38.6 Fno; 2.88~3.38~4.54 2ω; 61.26~28.61~13.16

| | Radius of curvature | Thickness or Distance between lenses | Refractive index (Nd) | Abbe number (Vd) |
|---|---|---|---|---|
| OBJ | ∞ | ∞ | | |
| 1 | 24.831 | 0.80 | 1.846663 | 23.748 |
| 2 | 17.499 | 3.16 | 1.733999 | 51.0541 |
| 3 | 167.400 | D11 | | |
| 4 | 36.038 | 0.70 | 1.834001 | 37.3451 |
| 5 | 7.096 | 3.36 | | |
| 6 | −19.226 | 0.60 | 1.487489 | 70.4412 |
| 7 | 17.686 | 0.20 | | |
| 8 | 13.160 | 2.00 | 1.846663 | 23.7848 |
| 9 | 89.065 | D12 | | |
| ST | Stop | 0.50 | | |
| 11 | 12.363 (Aspherical surface 1) | 1.73 | 1.583130 | 59.30 |
| 12 | −26.073 | 0.20 | | |
| 13 | 5.647 | 2.56 | 1.487489 | 70.4412 |
| 14 | 10.968 | 0.50 | 1.846663 | 23.7848 |
| 15 | 9.570 | D13 | | |
| 16 | 18.124 (Aspherical surface 2) | 2.13 | 1.583130 | 59.30 |
| 17 | −415.374 | D14 | | |
| 18 | ∞ | 0.50 | 1.516798 | 64.1983 |
| 19 | ∞ | 0.50 | | |
| 20 | ∞ | 0.50 | 1.516798 | 64.1983 |
| 21 | ∞ | 0.96 | | |
| IMG | ∞ | | | |

TABLE 2

| Aspherical coefficient | K | A | B | C | D |
|---|---|---|---|---|---|
| Aspherical surface 1 | 4.851021 | 0.378561E−03 | −0.121254E−05 | −0.603511E−07 | −0.670014E−08 |
| Aspherical surface 2 | −7.235452 | 0.916245E−04 | −0.141337E−05 | −0.307661E−07 | −0.657755E−09 |

TABLE 3

|  | Wide angle position | Medium angle position | Telephoto position |
|---|---|---|---|
| D11 | 0.70 | 9.21 | 15.58 |
| D12 | 18.04 | 7.08 | 1.53 |
| D13 | 6.20 | 8.46 | 19.52 |
| D14 | 5.23 | 7.35 | 5.45 |

FIGS. 2A through 2C illustrate spherical aberration, astigmatic field curvature, and distortion, respectively, of the zoom lens optical system of FIG. 1A when in the wide angle position. FIGS. 3A through 3C illustrate spherical aberration, astigmatic aberration, and distortion, respectively, of the zoom lens optical system of FIG. 1C when in the telephoto position.

FIGS. 2A and 3A illustrate spherical aberration of light with various wavelengths in a tangential (i.e., horizontal) direction of an optical system. That is, FIGS. 2A and 3A illustrate the aberration of light with wavelengths of 486.13 nm, 587.56 nm, and 656.28 nm with respect to a 0.25 field, a 0.50 field, a 0.75 field, and a 1.00 field. FIGS. 2B and 3B illustrate astigmatic field curvature, namely, tangential field curvature T and sagittal field curvature S. FIGS. 2C and 3C illustrate percent distortion.

Figure 4A:
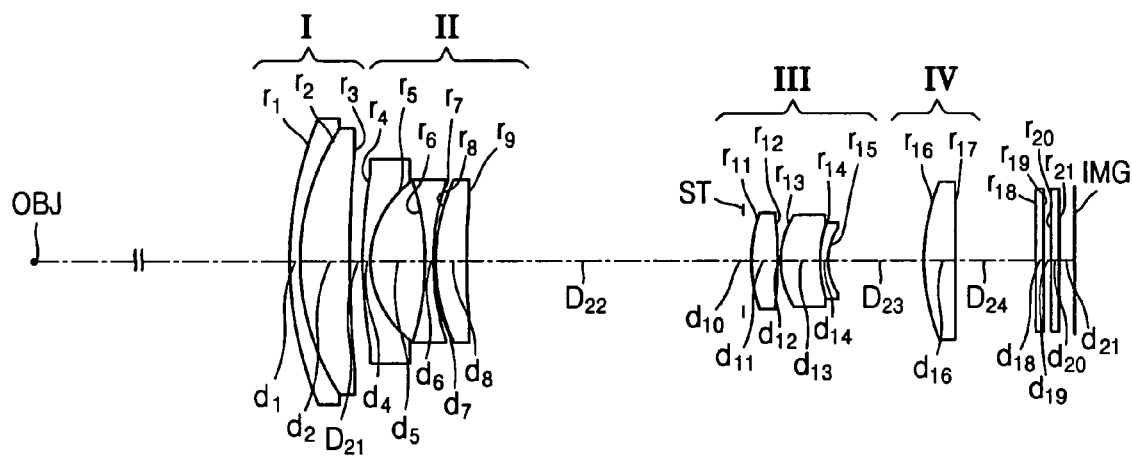
FIG. 4A is a cross-sectional view illustrating an optical configuration of a zoom lens optical system according to another embodiment of the present invention in a wide angle position.
Figure 4B:
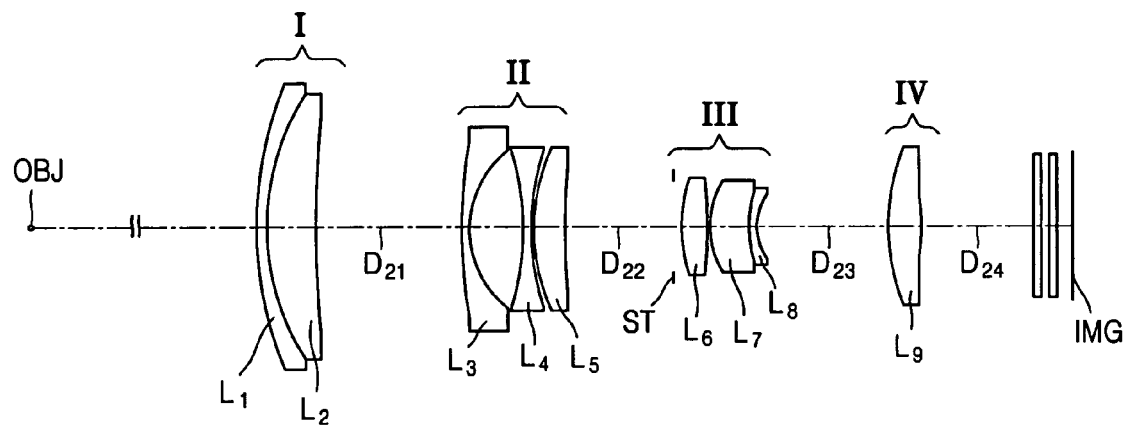
FIG. 4B is a cross-sectional view illustrating an optical configuration of the zoom lens optical system of FIG. 4A in a medium angle position.
Figure 4C:
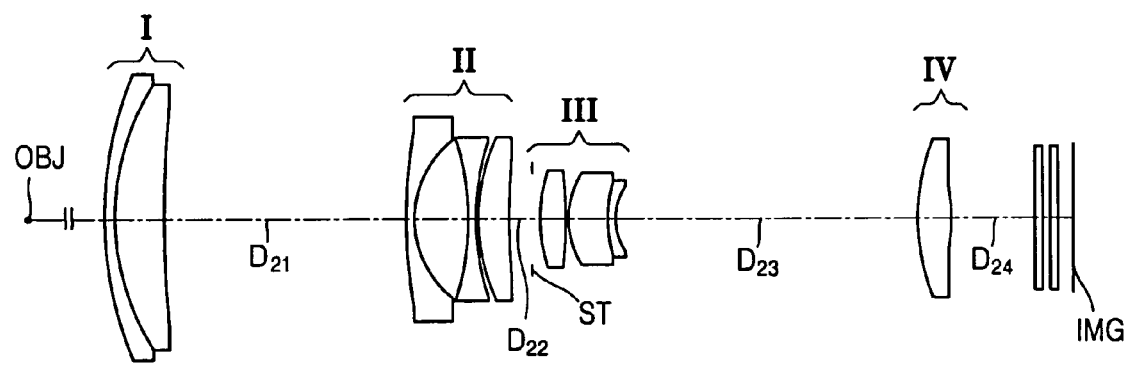
FIG. 4C is a cross-sectional view illustrating an optical configuration of the zoom lens optical system of FIG. 4A in a telephoto position.

FIGS. 4A through 4C illustrate optical configurations of a zoom lens optical system according to another embodiment of the present invention in a wide angle position, a medium angle position, and a telephoto position, respectively. Referring to FIGS. 4A through 4C, the zoom lens optical system includes a first lens group I having positive refractive power, a second lens group II having negative refractive power, a third lens group III having positive refractive power, and a fourth lens group IV having positive refractive power, arranged sequentially from an object OBJ. An aperture stop ST moving together with the third lens group III is interposed between the second lens group II and the third lens group III. The zooming operation of each of the lens groups and the number and zooming operation of lenses constituting each of the lens groups in the zoom lens optical system illustrated in FIGS. 4A through 4C are identical to those of the zoom lens optical system illustrated in FIGS. 1A through 1C. Lens data, that is, the radius of curvature, thickness or distance between lenses, refractive index, and Abbe number, of each of the lenses constituting the lens groups of the zoom lens optical system of the present embodiment are shown in Tables 4 through 6.

TABLE 4

F; 9.56~21.03~45.82    Fno; 3.13~3.76~5.02    2ω; 50.16~24.14~11.22

|  | Radius of curvature | Thickness or distance between lenses | Refractive index (Nd) | Abbe number (Vd) |
|---|---|---|---|---|
| OBJ | ∞ | ∞ | | |
| 1 | 23.684 | 0.35 | 1.846663 | 23.7848 |
| 2 | 16.601 | 3.25 | 1.733999 | 51.0541 |
| 3 | 137.768 | D21 | | |
| 4 | 22.013 | 0.43 | 1.834001 | 37.3451 |
| 5 | 6.282 | 3.15 | | |
| 6 | −22.470 | 0.35 | 1.487489 | 70.4412 |
| 7 | 15.751 | 0.14 | | |
| 8 | 10.759 | 1.97 | 1.846663 | 23.7848 |
| 9 | 34.498 | D22 | | |
| ST | Stop | 0.10 | | |
| 11 | 12.532 (Aspherical surface 3) | 1.76 | 1.583130 | 59.4600 |
| 12 | −26.267 | 0.45 | | |
| 13 | 5.861 | 2.60 | 1.487489 | 70.4412 |
| 14 | 10.882 | 0.52 | 1.846663 | 23.7848 |
| 15 | 8.525 | D23 | | |
| 16 | 12.544 (Aspherical surface 4) | 1.95 | 1.583130 | 59.4600 |
| 17 | 74.335 | D24 | | |
| 18 | ∞ | 0.50 | 1.516798 | 64.1983 |
| 19 | ∞ | 0.50 | | |
| 20 | ∞ | 0.50 | 1.516798 | 64.1983 |
| 21 | ∞ | 1.82 | | |
| IMG | ∞ | | | |

TABLE 5

| Aspherical coefficient | K | A | B | C | D |
|---|---|---|---|---|---|
| Aspherical surface 3 | 7.670993 | 0.429890E−03 | −0.303412E−05 | −0.193002E−06 | 0.152482E−07 |
| Aspherical surface 4 | 1.302513 | −0.198125E−04 | 0.709124E−06 | −0.369764E−07 | 0.724419E−09 |

TABLE 6

| | Wide angle position | Medium angle position | Telephoto position |
|---|---|---|---|
| D21 | 0.70 | 9.83 | 16.16 |
| D22 | 15.01 | 6.51 | 1.53 |
| D23 | 5.61 | 8.33 | 20.27 |
| D24 | 5.43 | 7.48 | 4.68 |

FIGS. 5A through 5C illustrate spherical aberration, astigmatic field curvature, and distortion, respectively, of the zoom lens optical system of FIG. 4A when in the wide angle position. FIGS. 6A through 6C illustrate spherical aberration, astigmatic field curvature, and distortion, respectively, of the zoom lens optical system of FIG. 4C when in the telephoto position.

Figure 7A:
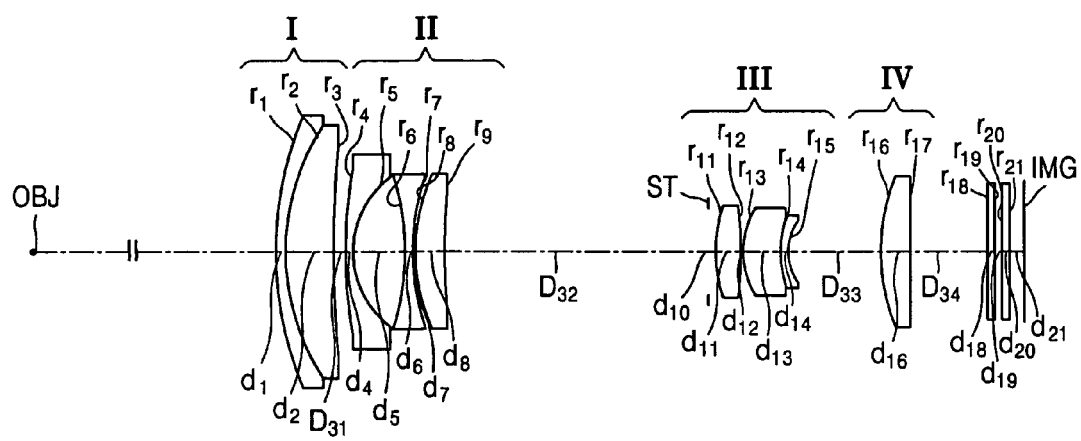
FIG. 7A is a cross-sectional view illustrating an optical configuration of a zoom lens optical system according to another embodiment of the present invention in a wide angle position.
Figure 7B:
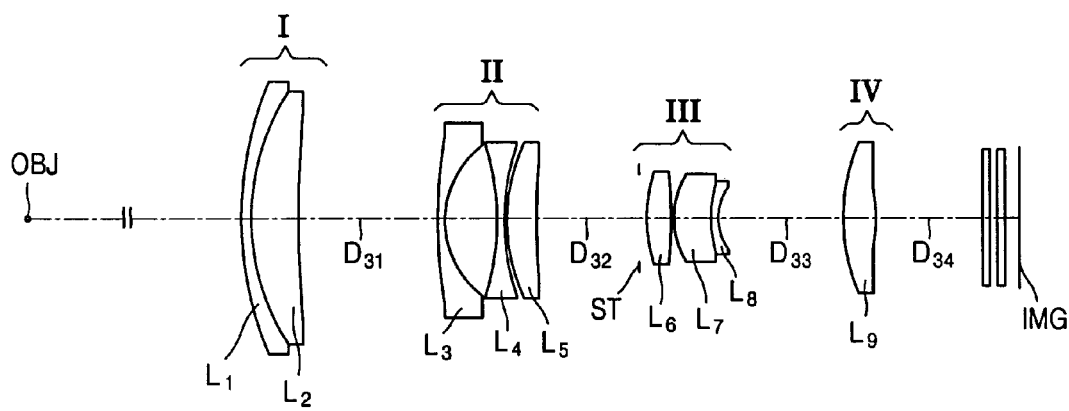
FIG. 7B is a cross-sectional view illustrating an optical configuration of the zoom lens optical system of FIG. 7A in a medium angle position.
Figure 7C:
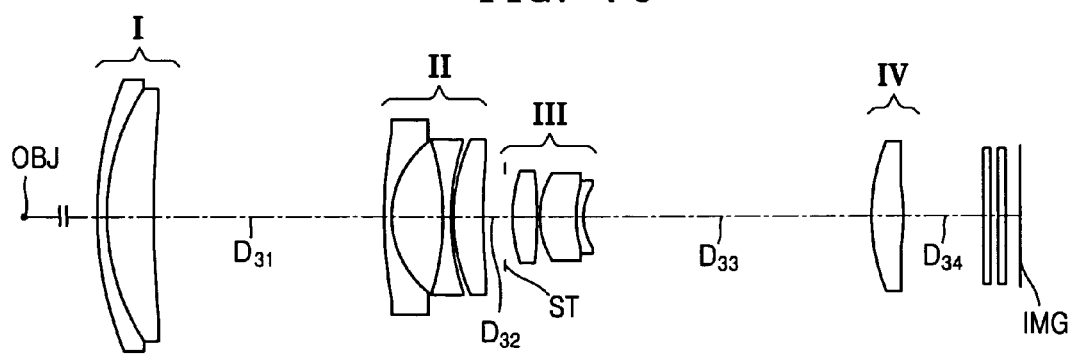
FIG. 7C is a cross-sectional view illustrating an optical configuration of the zoom lens optical system of FIG. 7A in a telephoto position.

FIGS. 7A through 7C illustrate optical configurations of a zoom lens optical system according to another embodiment of the present invention in a wide angle position, a medium angle position, and a telephoto position, respectively. Referring to FIGS. 7A through 7C, the zoom lens optical system includes a first lens group I having positive refractive power, a second lens group II having negative refractive power, a third lens group III having positive refractive power, and a fourth lens group IV having positive refractive power, arranged sequentially from an object OBJ. A stop ST moving together with the third lens group III is interposed between the second lens group II and the third lens group III. The zooming operation of each of the lens groups and the number and zooming operation of lenses constituting each of the lens groups in the zoom lens optical system illustrated in FIGS. 7A through 7C are identical to those of the zoom lens optical system illustrated in FIGS. 1A through 1C. Lens data, that is, the radius of curvature, thickness or distance between lenses, refractive index, and Abbe number of each of the lenses constituting the lens groups of the zoom lens optical system of the present embodiment are shown in Tables 7 through 9.

TABLE 7 f; 9.11~20.05~44.42    Fno; 3.06~3.67~4.97    2ω; 53.97~25.24~11.46

| | Radius of curvature | Thickness or distance between lenses | Refractive index (Nd) | Abbe number (Vd) |
|---|---|---|---|---|
| OBJ | ∞ | ∞ | | |
| 1 | 23.640 | 0.35 | 1.846663 | 23.7848 |
| 2 | 16.536 | 3.34 | 1.733999 | 51.0541 |
| 3 | 136.218 | D31 | | |
| 4 | 24.431 | 0.42 | 1.834001 | 37.3451 |
| 5 | 6.453 | 3.22 | | |
| 6 | −23.713 | 0.35 | 1.487489 | 70.4412 |
| 7 | 15.277 | 0.14 | | |
| 8 | 10.742 | 2.02 | 1.846663 | 23.7848 |
| 9 | 34.167 | D32 | | |
| ST | Stop | 0.10 | | |
| 11 | 18.473 (Aspherical surface 5) | 1.73 | 1.583130 | 59.30 |
| 12 | −26.422 | 0.57 | | |
| 13 | 5.875 | 2.60 | 1.487489 | 70.4412 |
| 14 | 10.897 | 0.53 | 1.846663 | 23.7848 |
| 15 | 8.522 | D33 | | |
| 16 | 13.087 (Aspherical surface 6) | 2.12 | 1.583130 | 59.30 |
| 17 | 3119.347 | D34 | | |
| 18 | ∞ | 0.50 | 1.516798 | 64.1983 |
| 19 | ∞ | 0.50 | | |
| 20 | ∞ | 0.50 | 1.516798 | 64.1983 |
| 21 | ∞ | 1.14 | | |
| IMG | ∞ | 0.00 | | |

TABLE 8

| Aspherical coefficient | K | A | B | C | D |
|---|---|---|---|---|---|
| Aspherical surface 5 | 9.645425 | 0.444651E−03 | −0.917514E−05 | −0.296987E−06 | 0.221055E−07 |
| Aspherical surface 6 | 0.947900 | 0.379130E−05 | 0.106796E−05 | −0.150004E−07 | 0.254380E−09 |

TABLE 9

| | Wide angle position | Medium angle position | Telephoto position |
|---|---|---|---|
| D31 | 0.70 | 9.80 | 16.13 |
| D32 | 15.01 | 6.33 | 1.53 |
| D33 | 5.66 | 8.38 | 20.49 |
| D34 | 5.47 | 7.44 | 4.69 |

Figure 8C:
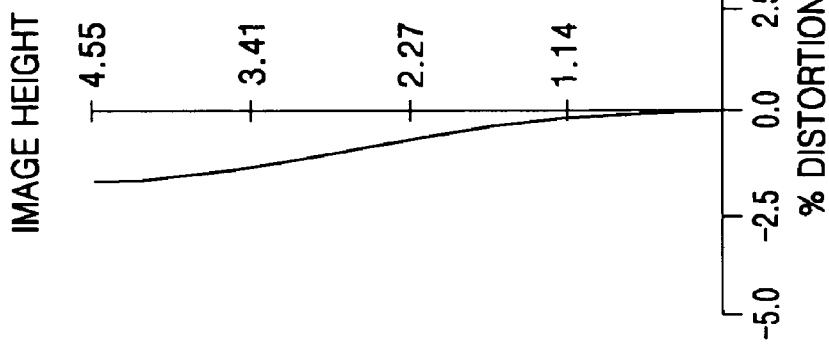
FIGS. 8A through 8C illustrate spherical aberration, astigmatic field curvature, and distortion, respectively, of the zoom lens optical system of FIG. 7A when in the wide angle position.
Figure 8B:
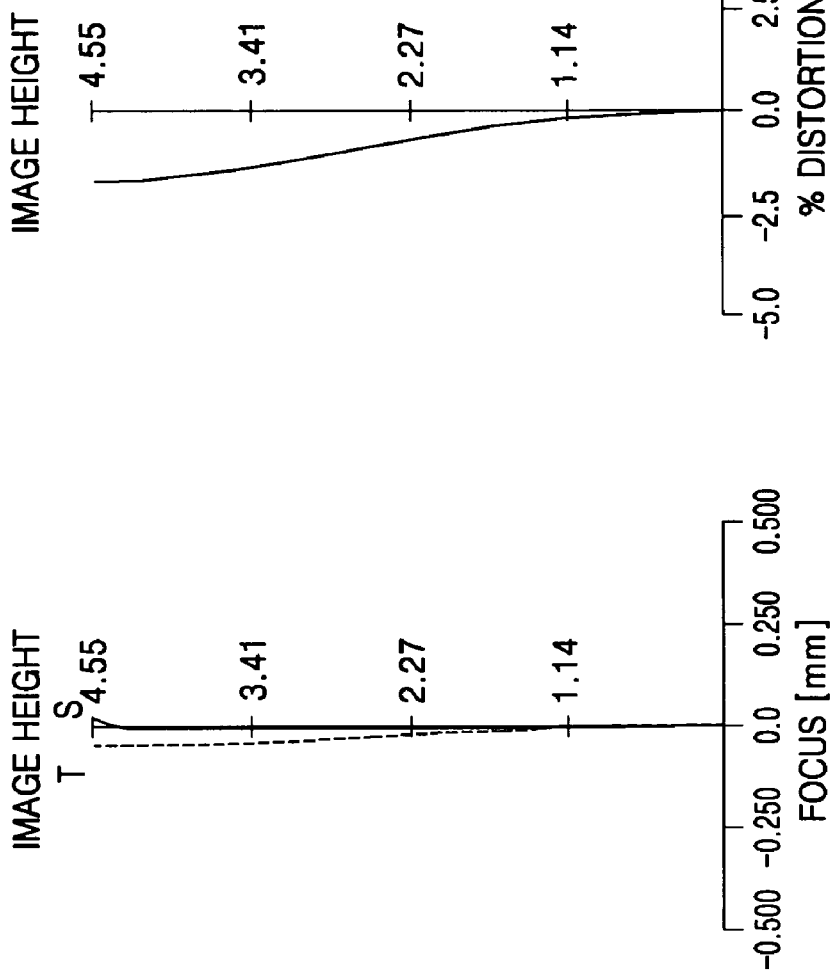
Figure 8A:
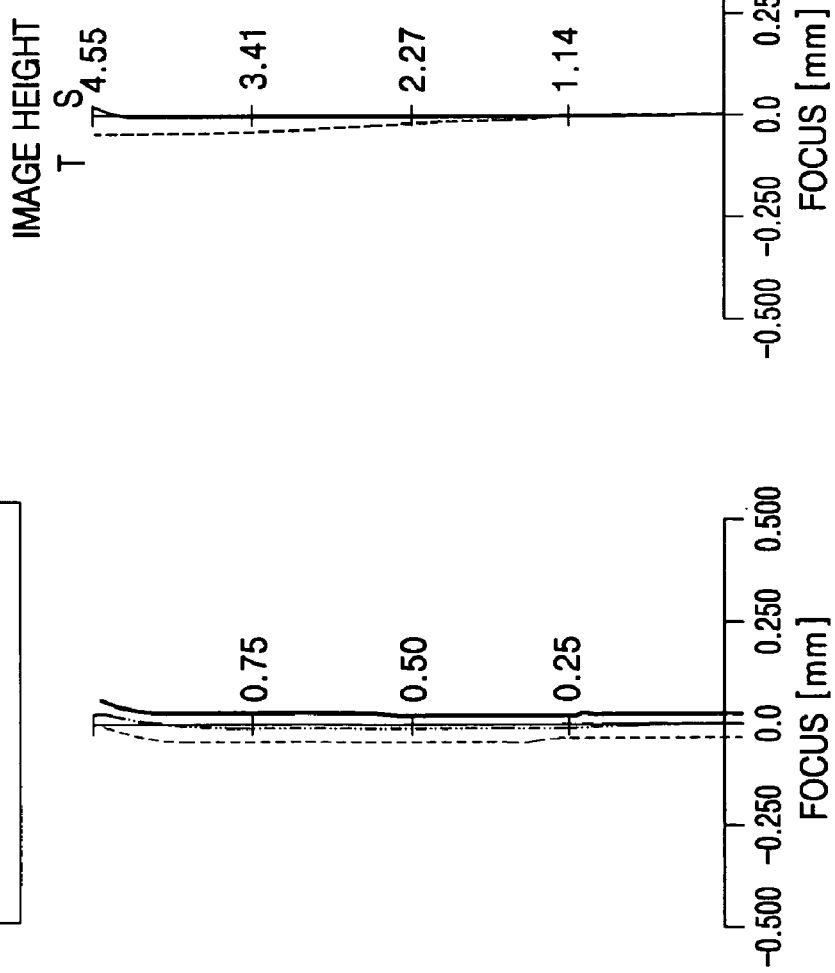

FIGS. 8A through 8C illustrate spherical aberration, astigmatic field curvature, and distortion, respectively, of the zoom lens optical system of FIG. 7A when in the wide angle position. FIGS. 9A through 9C illustrate spherical aberration, astigmatic field curvature, and distortion, respectively, of the zoom lens optical system of FIG. 7A when in the telephoto position.

In the above embodiments, the aspherical shapes 1 through 6 satisfy the following aspherical Equation 4.

$$x = \frac{c'y^2}{1 + \sqrt{1 - (K+1)c'^2 y^2}} + Ay^4 + By^6 + Cy^8 + Dy^{10} \quad (4)$$

where x denotes a depth from a vertex of a lens to a plane of the lens in a direction parallel to an optical axis, y denotes a height in a direction perpendicular to the optical axis, c'(=1/R) denotes a reciprocal of the radius of curvature R at the vertex of the lens, K denotes a conic constant, and A, B, C, and D denote aspherical coefficients.

Table 10 shows values of Formulae 1 through 3 in each of the embodiments illustrated in FIGS. 1A, 4A, and 7A, which are referred to as Embodiments 1, 2, and 3, respectively, in the table.

TABLE 10

|  | Embodiment 1 | Embodiment 2 | Embodiment 3 |
|---|---|---|---|
| Formula 1 | 7.98 | 6.22 | 6.57 |
| Formula 2 | 59.3 | 59.46 | 59.3 |
| Formula 3 | 1.77 | 1.81 | 1.98 |

As described above, since the zoom lens optical system includes the first through fourth lens groups, satisfies Formulae 1 through 3, and performs zooming from the wide angle position to the telephoto position so that the distance between the first lens group and the second lens group can increase, the distance between the second lens group and the third lens group can decrease, and the distance between the third lens group and the fourth lens group can increase, the zoom lens optical system can be made compact and color aberration such as spherical aberration, astigmatic field curvature, and percent distortion can be effectively corrected. Furthermore, a high zooming ratio can be ensured and costs can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A zoom lens optical system comprising:
a first lens group having positive refractive power;
a second lens group having negative refractive power;
a third lens group having positive refractive power; and
a fourth lens group having positive refractive power,
wherein the first through fourth lens groups are arranged sequentially from an object, zooming is performed from a wide angle position to a telephoto position so that the distance between the first lens group and the second lens group increases, the distance between the second lens group and the third lens group decreases, and the distance between the third lens group and the fourth lens group increases, and the first through fourth lens groups satisfy:

$$6 \leq \frac{L_W}{F_W} + \frac{L_t}{F_t} \leq 8$$

where $L_W$ denotes a distance between a first surface of an object-side lens of the first lens group and an image surface when in the wide angle position, $L_t$ denotes a distance between the first surface of the object-side lens of the first lens group and the image surface when in the telephoto position, $F_W$ denotes an overall focal length when in the wide angle position, and the $F_t$ denotes an overall focal length when in the telephoto position.

2. The zoom lens optical system of claim 1, wherein each of the third and fourth lens groups has an aspherical surface and satisfies $$58.8 \leq V_{d3} \leq 60.8$$

$$58.8 \leq V_{d4} \leq 60.8$$

where $V_{d3}$ denotes the Abbe number of an aspherical lens of the third lens group and $V_{d4}$ denotes the Abbe number of an aspherical lens of the fourth lens group.

3. The zoom lens optical system of claim 1, satisfying $$1.75 \leq \frac{F_t}{F_{IV}} \leq 2$$

where $F_t$ denotes an overall focal length when in the telephoto position and $F_{IV}$ denotes a focal length of the fourth lens group.

4. The zoom lens optical system of claim 1, wherein the fourth lens group is a single lens.

5. The zoom lens optical system of claim 1, wherein the first lens group comprises two lenses including a lens with positive refractive power.

6. The zoom lens optical system of claim 5, wherein the two lenses of the first lens group are combined with each other.

7. The zoom lens optical system of claim 1, wherein the third lens group is comprised of a plurality of lenses, at least two of which are combined with each other.

8. The zoom lens optical system of claim 1, wherein the third lens group comprises at least one aspherical lens.

9. The zoom lens optical system of claim 1, wherein at least one surface of a lens in the fourth lens group is aspherical.

10. The zoom lens optical system of claim 1, wherein when zooming from the wide angle position to the telephoto position, the fourth lens group is moved on a convex trajectory toward the object.

11. The zoom lens optical system of claim 1, wherein when zooming, at least the first and third lens groups are moved.

12. The zoom lens optical system of claim 1, wherein when zooming, at least the first through third lens groups are moved.

13. The zoom lens optical system of claim 1, wherein when zooming, the first through fourth lens groups are moved.

14. The zoom lens optical system of claim 1, further comprising an aperture stop interposed between the second lens group and the third lens group.

15. A zoom lens optical system comprising:
a first lens group having positive refractive power;
a second lens group having negative refractive power;
a third lens group having positive refractive power; and
a fourth lens group having positive refractive power,
wherein the first through fourth lens groups are arranged sequentially from an object, each of the third and fourth lens groups has an aspherical surface, zooming is performed from a wide angle position to a telephoto position so that the distance between the first lens group and the second lens group increases, the distance between the second lens group and the third lens group decreases, and the distance between the third lens group and the fourth lens group increases, and the first through fourth groups satisfy:

$$58.8 \leq V_{d3} \leq 60.8$$

$$58.8 \leq V_{d4} \leq 60.8$$

where $V_{d3}$ denotes the Abbe number of an aspherical lens of the third lens group and $V_{d4}$ denotes the Abbe number of an aspherical lens of the fourth lens group.

16. The zoom lens optical system of claim 15, satisfying $$1.75 \leq \frac{F_t}{F_{IV}} \leq 2$$

where $F_t$ denotes an overall focal length when in the telephoto position and $F_{IV}$ denotes a focal length of the fourth lens group.

17. The zoom lens optical system of claim 15, wherein the fourth lens group comprises a single lens.

18. The zoom lens optical system of claim 15, wherein the first lens group comprises two lenses including a lens with positive refractive power.

19. The zoom lens optical system of claim 18, wherein the two lenses of the first lens group are combined with each other.

20. The zoom lens optical system of claim 15, wherein the third lens group comprises a plurality of lenses, at least two of which are combined with each other.

21. The zoom lens optical system of claim 15, wherein the third lens group comprises at least one aspherical lens.

22. The zoom lens optical system of claim 15, wherein at least one surface of a lens of the fourth lens group is aspherical.

23. The zoom lens optical system of claim 15, wherein when zooming from the wide angle position to the telephoto position, the fourth lens group is moved on a convex trajectory toward the object.

24. The zoom lens optical system of claim 15, wherein when zooming, at least the first and third lens groups are moved.

25. The zoom lens optical system of claim 15, wherein when zooming, at least the first through third lens groups are moved.

26. The zoom lens optical system of claim 15, wherein when zooming, the first through fourth lens groups are moved.

27. The zoom lens optical system of claim 15, further comprising an aperture stop interposed between the second lens group and the third lens group.

28. A camera having a zoom lens system according to claim 1.

* * * * *